US011405764B2

(12) United States Patent
Chatterjee et al.

(10) Patent No.: US 11,405,764 B2
(45) Date of Patent: Aug. 2, 2022

(54) MULTIPLE PARALLEL WEBRTC ACCESSES TO IMS

(71) Applicant: NOKIA SOLUTIONS AND NETWORKS OY, Espoo (FI)

(72) Inventors: Suprabhat Chatterjee, Bangalore (IN); Peter Leis, Penzberg (DE); Jiadong Shen, Munich (DE); Alexander Milinski, Munich (DE); Martin Oettl, Weilheim (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 608 days.

(21) Appl. No.: 15/543,834

(22) PCT Filed: Jan. 20, 2015

(86) PCT No.: PCT/EP2015/050992
§ 371 (c)(1),
(2) Date: Jul. 14, 2017

(87) PCT Pub. No.: WO2016/116137
PCT Pub. Date: Jul. 28, 2016

(65) Prior Publication Data
US 2018/0006998 A1   Jan. 4, 2018

(51) Int. Cl.
*G06F 15/16* (2006.01)
*H04W 4/50* (2018.01)
(Continued)

(52) U.S. Cl.
CPC .......... *H04W 4/50* (2018.02); *H04L 61/3015* (2013.01); *H04L 61/3095* (2013.01);
(Continued)

(58) Field of Classification Search
CPC .......... H04L 61/1588; H04L 29/06217; H04L 65/1073; H04L 65/1016; H04L 61/3095; H04L 61/3015; H04W 8/265; H04W 4/50
(Continued)

(56) References Cited

U.S. PATENT DOCUMENTS 10,117,090 B2 * 10/2018 Jahangir ............. H04L 65/1016
2006/0242184 A1 * 10/2006 Shur ................... G06F 16/9024
(Continued)

OTHER PUBLICATIONS

B. Panwar and K. Singh, "IMS SIP core server test bed," 2007 International Conference on IP Multimedia Subsystem Architecture and Applications, Bangalore, 2007, pp. 1-5, (Year: 2007).*
(Continued)

*Primary Examiner* — Taylor A Elfervig
(74) *Attorney, Agent, or Firm* — Squire Patton Boggs (US) LLP

(57) ABSTRACT

It is provided a method, comprising monitoring, for each of plural attempts of a web identity to register for an internet protocol multimedia service, if the respective attempt is received; generating, for each of the plural attempts if the respective attempt is received, a respective private user identification based on the web identity and a respective distinguishing identifier, wherein probability that two of the private user identifications have a same value is less than a predefined limit; providing the respective private user identification in response to the respective attempt.

14 Claims, 4 Drawing Sheets

(51) Int. Cl.
| | |
|---|---|
| H04L 101/395 | (2022.01) |
| H04W 8/26 | (2009.01) |
| H04L 65/1073 | (2022.01) |
| H04L 61/3015 | (2022.01) |
| H04L 65/1016 | (2022.01) |
| H04L 61/4588 | (2022.01) |

(52) U.S. Cl.
 CPC ...... *H04L 65/1016* (2013.01); *H04L 65/1073* (2013.01); *H04W 8/265* (2013.01); *H04L 29/06217* (2013.01); *H04L 61/1588* (2013.01)

(58) Field of Classification Search
 USPC .......................................................... 709/245
 See application file for complete search history.

(56) References Cited

U.S. PATENT DOCUMENTS

| | | | | |
|---|---|---|---|---|
| 2009/0093249 | A1* | 4/2009 | Zhu | H04W 8/06 455/433 |
| 2011/0124339 | A1* | 5/2011 | Alriksson | H04L 29/12311 455/435.1 |
| 2011/0194459 | A1* | 8/2011 | Belinchon Vergara | H04L 29/12188 370/254 |
| 2012/0036270 | A1* | 2/2012 | Escribano Bullon | H04L 65/1016 709/227 |
| 2012/0185938 | A1* | 7/2012 | Grume | H04L 63/1441 726/23 |
| 2012/0302233 | A1* | 11/2012 | Moermans | H04L 65/1016 455/432.3 |
| 2014/0171027 | A1* | 6/2014 | Arkko | H04L 63/0853 455/411 |
| 2015/0245206 | A1* | 8/2015 | Le Rouzic | H04W 60/04 726/5 |

OTHER PUBLICATIONS

M. Abid, S. Song, H. Moustafa, H Afifi: Integrating Identity-Based Cryptography in IMS Service Authentication, International Journal of Network Security & Its Applications, 2009 (Year: 2009).*

Islam, Salekul and Jean-Charles Grégoire. "User-centric service provisioning for IMS." Mobility Conference (2009)., Semantic Scholar, p. 1-8 (Year: 2009).*

Yacine Belala and James Wong. 2009. Towards identity-based services in IMS. In Proceedings of the 2009 International Conference on Wireless Communications and Mobile Computing: Connecting the World Wirelessly (IWCMC '09) (Year: 2009).*

3GPP TR 23.706 V0.0.0 (Jul. 2014), p. 1-32, 2014 (Year: 2014).*

Mohamed Abid, et al., . 2009. Efficient identity-based authentication for IMS based services access. In Proceedings of the 7th International Conference on Advances in Mobile Computing and Multimedia (MoMM '09). Association for Computing Machinery, New York, NY, US, p. 260-266 (Year: 2009).*

B. Panwar and K. Singh, "IMS SIP core server test bed," 2007 International Conference on IP Multimedia Subsystem Architecture and Applications, 2007, pp. 1-5 (Year: 2007).*

Voznak et al., "Workshop Knowledge in Telecommunication Technologies and Optics 2012", Workshop of the 12th International Conference KTTO 2012, Workshop proceedings, p. 1-58 (Year: 2012).*

V. Bajaj, "Roaming between GSM/UMTS and IMS networks," 2008 3rd International Conference on Communication Systems Software and Middleware and Workshops (COMSWARE '08), 2008, pp. 488-494 (Year: 2008).*

Boman, Krister, "3GPP TSG SA WG3 Security—S3#19—Requirements related to private and public identities in IMS", (S3-010402) p. 1-13, 2001 (Year: 2001).*

Jadoon, M, "Evaluation of UICC-based IMS authentication schemes", thesis, Blekinge Institute of Technology School of Engineering Department of Telecommunication systems, p. 1-61, 2009 (Year: 2009).*

International Search Report & Written Opinion dated Sep. 28, 2015 corresponding to International Patent Application No. PCT/EP2015/050992.

3GPP TR 23.706 V0.1.2 (Dec. 2014), Technical Report, 3rd Generation Partnership Project; Technical Specification Group Services and System Aspects; Study on enhancements to Web Real Time Communication (WebRTC) access to IP Multimedia Subsystem (IMS) Stage 2; (Release 13), Dec. 1, 2014, XP050945553.

3GPP TS 23.003 V12.5.0 (Dec. 2014), Technical Specification, 3rd Generation Partnership Project; Technical Specification Group Core Network and Terminals; Numbering, addressing and identification (Release 12), Dec. 29, 2014, XP050906739.

3GPP TS 23.228 V13.1.0 (Dec. 2014), Technical Specification, 3rd Generation Partnership Project; Technical Specification Group Services and System Aspects; IP Multimedia Subsystem (IMS); Stage 2 (Release 13), Dec. 2014.

P. Leach et al., "A Universally Unique IDentifier (UUID) URN Namespace," Network Working Group, RFC 4122, Jul. 2005, pp. 1-32.

* cited by examiner

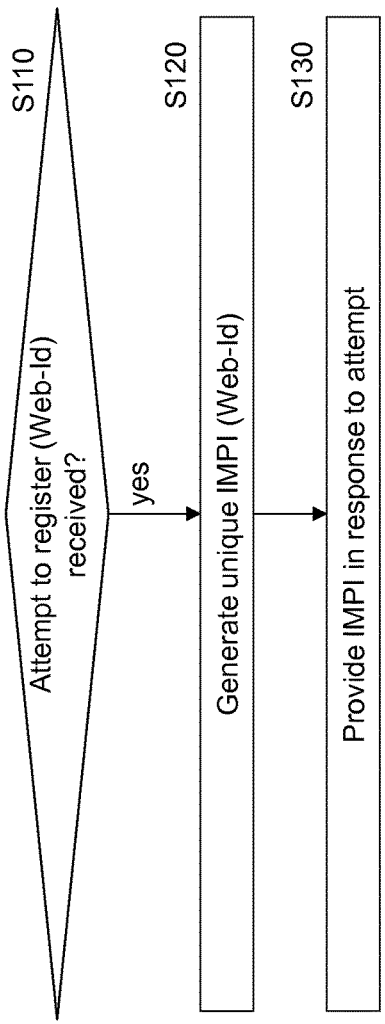
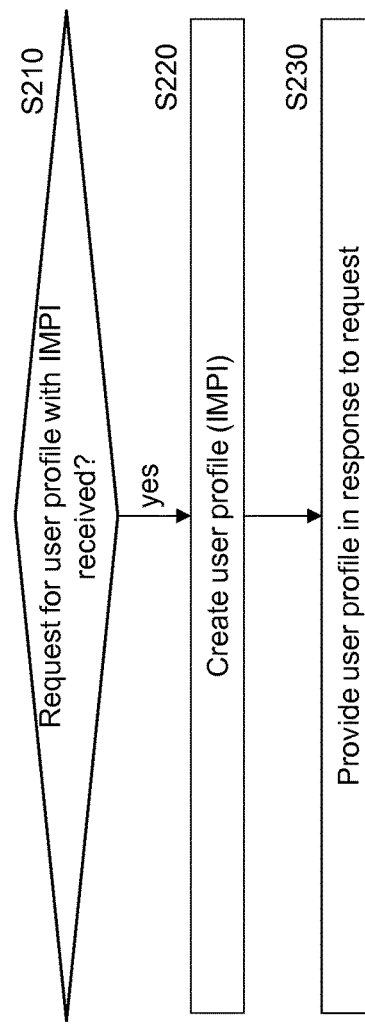
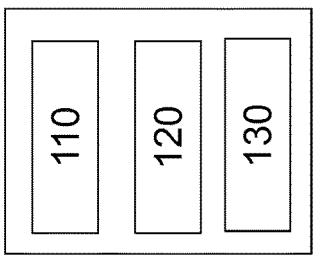
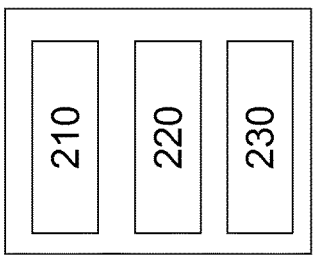
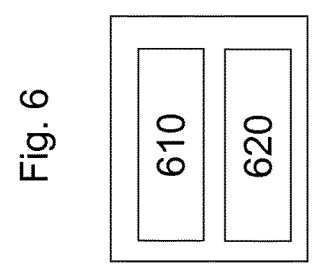

MULTIPLE PARALLEL WEBRTC ACCESSES TO IMS

FIELD OF THE INVENTION

The present invention relates to an apparatus, a method, and a computer program product related to mobile communication. More particularly, the present invention relates to an apparatus, a method, and a computer program product related to access to IMS.

BACKGROUND OF THE INVENTION

Abbreviations

3GPP 3rd Generation Partnership Project
ALG Application Level Gateway
CN Core Network
CSCF Call Session Control Function
EDGE Enhanced Datarate for GSM Evolution
eIMS-AGW enhanced IMS Access Gateway
eP-CSCF enhanced P-CSCF
EPC Evolved Packet Core
EPS Evolved Packet System
GPRS Generic Packet Radio Service
GSM Global System for Mobile Communication
HPLMN Home PLMN
HSS Home Subscriber Server
HTTP Hypertext Transfer Protocol
H/V- Home-/Visited-
I-CSCF Interrogating CSCF
ID Identifier
IM IP multimedia
IMPI IMS Private User Identity
IMPU IMS Public User Identity
IMS IM subsystem
IP Internet Protocol
IP-CAN IP Connectivity Access Network
LTE Long Term Evolution
LTE-A LTE Advanced
NAT Network Address Translation
P-CSCF Proxy CSCF
PCEF Policy and Charging Enforcement Function
PCRF Policy and Charging Rules Function
PLMN Public Land Mobile Network
Rel Release
RFC Request for Comments
RTC Real Time Communication
S-CSCF Serving CSCF
SHA Secure Hash Algorithm
sip Session Initiation Protocol
TR Technical Report
TS Technical Specification
UE User Equipment
UMTS Universal Mobile Telecommunications System
URI Uniform Resource Identifier
UTRAN UMTS Terrestrial Radio Access Network
UUID Universally Unique Identifier
WAF WebRTC Authorization Function
WebRTC Web RTC
WIC WebRTC IMS Client
WiFi Wireless Fidelity
WLAN Wireless Local Area Network
WWSF WebRTC Web Server Function The IP multimedia core network (IM CN), also named IP multimedia subsystem (IMS), enables PLMN operators to offer their subscribers multimedia services based on and built upon internet applications, services and protocols. Different ways to access the IMS are provided for users, with WebRTC being one of them. WebRTC based access has been specified in 3GPP Rel-12 and is documented in 3GPP TS 23.228.

The Rel-12 functionality is enhanced in 3GPP Rel-13. The Rel-13 enhancements are currently studied and documented in 3GPP TR 23.706.

FIG. 1 (taken from 3GPP TS 23.228) shows the high level architecture for WebRTC based access to IMS.

A WebRTC IMS Client (WIC) is an application using the WebRTC extensions specified in WebRTC 1.0 and providing access to IMS by interoperating with the WebRTC IMS access architecture which may comprise WAF, eP-CSCF, I-CSCF, and S-CSCF.

The WebRTC Web Server Function (WWSF) is the initial point of contact in the Web that controls access to the IMS communications services for the user. The WWSF manages the allocation of authorized IMS identities to WICs. The WWSF may provide the JavaScript WIC application for downloading to the browser on the UE. The WWSF may be located either in the operator network or a third party network. For example, the WWSF may provide the Web page presenting the user interface to the user for IMS access.

The P-CSCF enhanced for WebRTC (eP-CSCF) is a P-CSCF including the IMS-ALG functionality and with e.g. the following additional functions:

The eP-CSCF shall support at least one WebRTC IMS client-to-network signalling protocol,
The eP-CSCF verifies that the UE is executing a WIC from an authorized WWSF.
For users authorized by the WWSF or WAF:
    The eP-CSCF shall verify any UE authorization information received from the WIC;
    The eP-CSCF shall verify that the WWSF is authorized to allocate IMS identities;
For this purpose the eP-CSCF can identify an existing trust relationship between the eP-CSCF and the WWSF or WAF.

The eP-CSCF may be located in the domain of the operator that provides the WWSF or with which the WWSF has a service level agreement.

The IMS-AGW enhanced for WebRTC (eIMS-AGW) is a standard IMS-AGW with some additional characteristics and functions related to WeBRTC.

The WebRTC Authorisation Function (WAF) has the following functions:
    The WAF shall issue the authorisation token to WWSF.
    The WAF may either authenticate the user itself as part of the token issuance process, or it trusts the user identity provided by the WWSF.
    The WAF may either reside in the operator domain or the third party domain. The WWSF may include WAF functionality in the case WWSF and WAF are in the same domain.

As conventionally known, the UE interworks with IMS via NAT and IP-CAN. PCEF enforces policy and charging rules provided by PCRF.

One of the features related to Rel-13 is "WebRTC support of IMS subscriptions corresponding to users managed by third parties". There are different ways as to how to solve this requirement and Nokia has contributed the solution which is documented in 3GPP TR 23.706, section 5.2.3, with the title "HSS supports IMS subscriptions corresponding to users managed by third parties".

SUMMARY OF THE INVENTION

It is an object of the present invention to improve the prior art.

According to a first aspect of the invention, there is provided an apparatus, comprising monitoring means adapted to monitor, for each of plural attempts of a web identity to register for an internet protocol multimedia service, if the respective attempt is received; private identification generating means adapted to generate, for each of the plural attempts if the respective attempt is received, a respective private user identification based on the web identity and a respective distinguishing identifier, wherein a probability that two of the private user identifications have a same value is less than a predefined limit; providing means adapted to provide the respective private user identification in response to the respective attempt.

The apparatus may further comprise public identification generating means adapted to generate a public user identification based on the web identity, and the providing means is further adapted to provide the public user identification in response to each of the plural attempts.

The apparatus may further comprise checking means adapted to check if the web identity is authenticated; inhibiting means adapted to inhibit, if the web identity is not authenticated, the private identification generating means from generating and/or the providing means from providing.

The private identification generating means may be adapted to generate a portion of each of the private user identifications based on a template.

Each of the private user identifications may be unique under all private user identifications.

Each of the respective portions may be additionally based on a respective random number and/or on a time when the respective private user identification is generated.

The apparatus may further comprise counting means adapted to count the private user identifications in order to obtain a number of the private user identifications; prohibiting means adapted to prohibit, if the number of the private user identifications is larger than a threshold, generating by the private identification generating means and/or providing by the providing means.

According to a second aspect of the invention, there is provided an apparatus, comprising monitoring means adapted to monitor if a request to create a user profile is received, wherein the request comprises a private user identification; creating means adapted to create, if the request is received, the user profile based on the private user identification; providing means adapted to provide the user profile in response to the request.

The apparatus may further comprise validating means adapted to validate the private user identification based on a template.

The request may comprise additionally a public user identification; and the creating means may be adapted to create the user profile additionally based on the public user identification.

According to a third aspect of the invention, there is provided an apparatus, comprising monitoring circuitry configured to monitor, for each of plural attempts of a web identity to register for an internet protocol multimedia service, if the respective attempt is received; private identification generating circuitry configured to generate, for each of the plural attempts if the respective attempt is received, a respective private user identification based on the web identity and a respective distinguishing identifier, wherein a probability that two of the private user identifications have a same value is less than a predefined limit; providing circuitry configured to provide the respective private user identification in response to the respective attempt.

The apparatus may further comprise public identification generating circuitry configured to generate a public user identification based on the web identity, and the providing circuitry is further configured to provide the public user identification in response to each of the plural attempts.

The apparatus may further comprise checking circuitry configured to check if the web identity is authenticated; inhibiting circuitry configured to inhibit, if the web identity is not authenticated, the private identification generating circuitry from generating and/or the providing circuitry from providing.

The private identification generating circuitry may be configured to generate a portion of each of the private user identifications based on a template.

Each of the private user identifications may be unique under all private user identifications.

Each of the respective portions may be additionally based on a respective random number and/or on a time when the respective private user identification is generated.

The apparatus may further comprise counting circuitry configured to count the private user identifications in order to obtain a number of the private user identifications; prohibiting circuitry configured to prohibit, if the number of the private user identifications is larger than a threshold, generating by the private identification generating circuitry and/or providing by the providing circuitry.

According to a fourth aspect of the invention, there is provided an apparatus, comprising monitoring circuitry configured to monitor if a request to create a user profile is received, wherein the request comprises a private user identification; creating circuitry configured to create, if the request is received, the user profile based on the private user identification; providing circuitry configured to provide the user profile in response to the request.

The apparatus may further comprise validating circuitry configured to validate the private user identification based on a template.

The request may comprise additionally a public user identification; and the creating circuitry may be configured to create the user profile additionally based on the public user identification.

According to a fifth aspect of the invention, there is provided a method, comprising monitoring, for each of plural attempts of a web identity to register for an internet protocol multimedia service, if the respective attempt is received; generating, for each of the plural attempts if the respective attempt is received, a respective private user identification based on the web identity and a respective distinguishing identifier, wherein a probability that two of the private user identifications have a same value is less than a predefined limit; providing the respective private user identification in response to the respective attempt.

The method may further comprise generating a public user identification based on the web identity, and providing the public user identification in response to each of the plural attempts.

The method may further comprise checking if the web identity is authenticated; inhibiting, if the web identity is not authenticated, the generating of the respective private user identification and/or the providing of the respective private user identification.

The generating of the private user identifications may comprise generating a portion of each of the private user identifications based on a template.

Each of the private user identifications may be unique under all private user identifications.

Each of the respective portions may be additionally based on a respective random number and/or on a time when the respective private user identification is generated.

The method may further comprise counting the private user identifications in order to obtain a number of the private user identifications; prohibiting, if the number of the private user identifications is larger than a threshold, the generating of the private user identifications and/or the providing of the private user identifications.

According to a sixth aspect of the invention, there is provided a method, comprising monitoring if a request to create a user profile is received, wherein the request comprises a private user identification; creating, if the request is received, the user profile based on the private user identification; providing the user profile in response to the request.

The method may further comprise validating the private user identification based on a template.

The request may comprise additionally a public user identification; and the creating may be adapted to create the user profile additionally based on the public user identification.

The method of each of the fifth and sixth aspects may be a method of providing access to a multimedia subsystem.

According to a seventh aspect of the invention, there is provided a computer program product comprising a set of instructions which, when executed on an apparatus, is configured to cause the apparatus to carry out the method according to any one of the fifth and sixth aspects. The computer program product may be embodied as a computer-readable medium or directly loadable into a computer.

According to some embodiments of the invention, at least the following advantages are provided:
A user may register in parallel from different clients (different terminals (devices) and/or different browser instances within the same device);
The user may receive terminating calls at all registered terminal;
The solution is backwards compatible for the UE and most involved network elements.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein

FIG. 4 shows an apparatus according to an embodiment of the invention;

FIG. 5 shows a method according to an embodiment of the invention;

FIG. 6 shows an apparatus according to an embodiment of the invention;

FIG. 7 shows a method according to an embodiment of the invention; and

FIG. 8 shows an apparatus according to an embodiment of the invention.

DETAILED DESCRIPTION OF CERTAIN EMBODIMENTS

Figure 1:
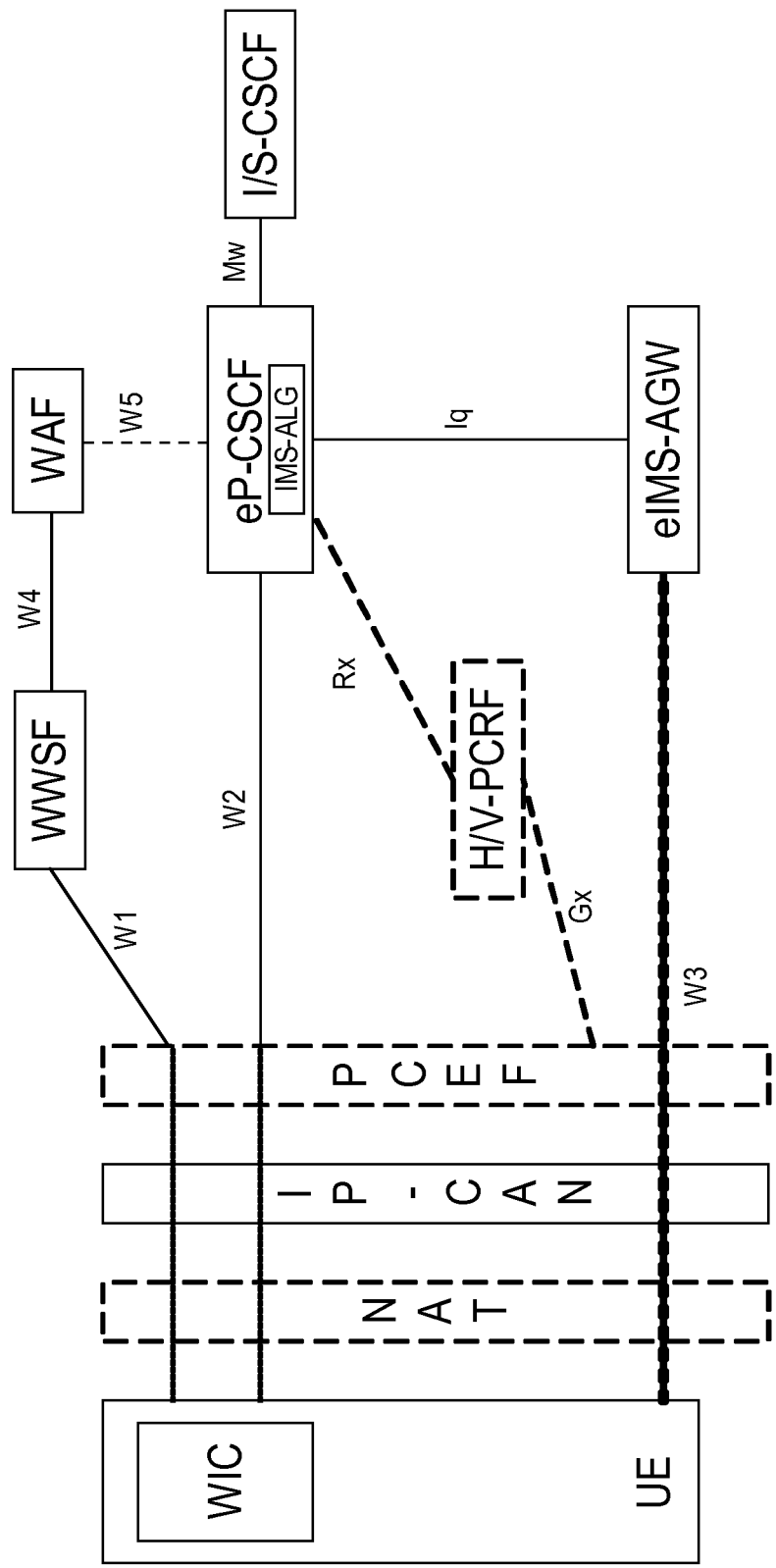
FIG. 1 shows an IMS service centralization and continuity reference architecture (taken from 3GPP TS 23.228)

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

One open aspect within the mentioned solution "HSS supports IMS subscriptions corresponding to users managed by third parties" for "WebRTC support of IMS subscriptions corresponding to users managed by third parties" is how a user will register its Web identity (e.g. peter@gmail.com) in parallel from different terminals (either different devices or different browser instances located in same device).

Conventionally, the eP-CSCF receives a pair of IMPI and IMPU at IMS registration. This pair is created by WWSF based on the web identity of the user. Hence, if the user registers from two clients, the second registration will be considered as a re-registration such that the first registration is deleted. Accordingly, the user cannot be registered at two or more clients in parallel.

According to some embodiments of the invention, a use case is supported where one subscriber registers its Web identity in the IMS in parallel from different clients (different terminals and/or different browser instances on a same terminal).

In detail, according to some embodiments of the invention, the WWSF provides IMS private user identities to registrations for the same Web identity such that these IMS private user identities (IMPI) are provided such that the private user identities are unique with respect to the registrations. That is, different private user identities are provided for different registrations of the same Web identity.

These IMPIs are used to allow multiple parallel registrations for the same Web Identity from different devices (WICs).

These IMPIs may be based on a template such that HSS can decide whether or not the IMPI is valid. An example is provided in the registration flows of FIGS. 2 and 3.

Note that, with this approach, the IMPU allocated for each of these registrations may be the same. Terminating requests towards on of these WICs may be addressed in a conventional way.

According to some embodiments of the invention, the following example procedure may be implemented in the WWSF in order to generate unique IMPI as part of the web authentication for a WIC using a Web Identity.
1. WIC logs into WWSF and completes web authentication procedure, using its Web Identity. The WWSF may use the services of the WAF to help complete the web authentication of the WIC.
2. At the WWSF, once the web authentication is complete, the WWSF generates the IMS identities for the WIC using the following formulas:

a. IMPI={USERNAME(WEB-ID)+UNDERSCORE+ fn(WWSFhostname)}@{template IMPI host part}, wherein "fn( )" means "function of ( )".
b. IMPU =sip: {(USERNAME(WEB-ID)}@{template IMPU host part}
3. The WWSF will provide these identities to the WIC (e.g. along with the Javascript client).
4. The WIC will perform IMS registration using the unique
IMPU/IMPI pair provided to it by the WWSF.

fn(WWSFhostname) may ensure generation of a (substantially) unique string for a given WWSF (for e.g. generating a UUID based on RFC 4122). Preferably, the string is globally unique. According to some embodiments of the invention, the IMPI matches the template provisioned also in HSS.

Instead of UNDERSCORE, another separator may be used, or the parts of IMPI may be concatenated taking into account some other rule in order to allow separation of the parts. Also, the sequence of parts may be changed.

A more precise example of the formula for generating IMPI is the following:
IMPI={(USERNAME(WEB-ID)+UNDERSCORE+ SHA-1(WWSFhostname+UUID))}@{template IMPI host part}

The "inner" UUID in the formula is not limited as long as fn(WWSFhostname)=SHA-1(WWSFhostname+UUID)) is (substantially) unique. E.g., it may be a random number, and/or it may be generated based on a time stamp.

In some embodiments of the invention, as a security measure, the WWSF may not generate, for the same WEB-ID, more than N valid IMPU/IMPIs. In some embodiments of the invention, also the total number M of IMPU/IMPIs may be limited. Each of the respective numbers N, M (integer 1) may be administered or predefined.

In some embodiments of the invention, IMPU/IMPI are provisioned at HSS and known to WWSF by some external means (e.g. via OAM). This is advantageous such that HSS can apply basic IMS handling as specified in 3GPP TS 23.228. IMPU/IMPI may follow a so called template. For IMPU this concept is already documented in TR 23.706.

Figure 2:
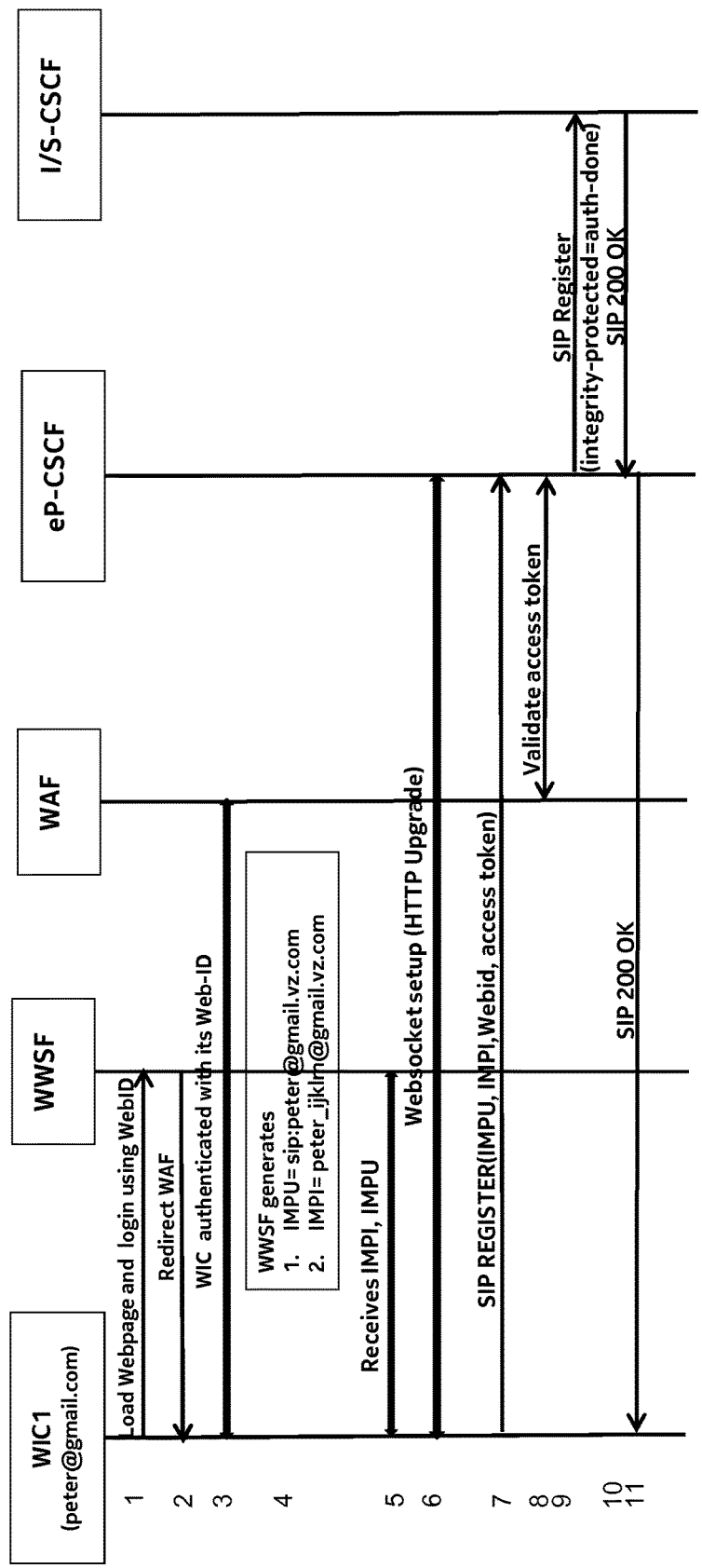
FIG. 2 shows a call flow according to an embodiment of the invention.

Call flows for registration from two different WICs using the same Web-id according to some embodiments of the invention are shown in the following FIGS. 2 and 3:

A user with Web-Id peter@gmail.com would like to have WebRTC based access from client WIC1. In 1, he loads the webpage from WWSF and logs into WWSF using his Web-Id. Thus, an authentication session is started. In 2, the authentication request is redirected to WAF. In 3, WIC is authenticated based on the Web-Id. In addition, WAF may provide a token to WIC1. Then, in 4, WWSF generates IMPPU and IMPI using the Web-Id based on prior administration. E.g., the following templates may be provided by prior administration:

Template IMPU : : sip:![a-zA-Z0-9].*!@gmail.vz.com
Template IMPI : : <userinfo>!.*!@gmail.vz.com In the example of FIG. 2, IMPU=sip:peter@gmail.vz.com and IMPI=peter_ijklm@gmail.vz.com are generated. In 5, WWSF provides IMPI and IMPU to WIC1 which receives them.

In 6 to 11, WIC registers at eP-CSCF in the conventional way using IMPI, IMPU and the token. I.e., in 6, a WebSocket connection is set up between WIC1 and eP-CSCF. In 7, WIC sends a SIP REGISTER request comprising IMPU, IMPI, Web-Id and the token to eP-CSCF. In 8, the token is validated by WAF. In 9, eP-CSCF forwards the SIP REGISTER request to I-CSCF (and from there further to S-CSCF and HSS), indicating that authentication was done (authentication less SIP registration). 10 and 11 are the OK responses to 9 and 7, respectively.

That is, the call flow shown in FIG. 2 is a conventional one except for the generation of the IMPI.

Figure 3:
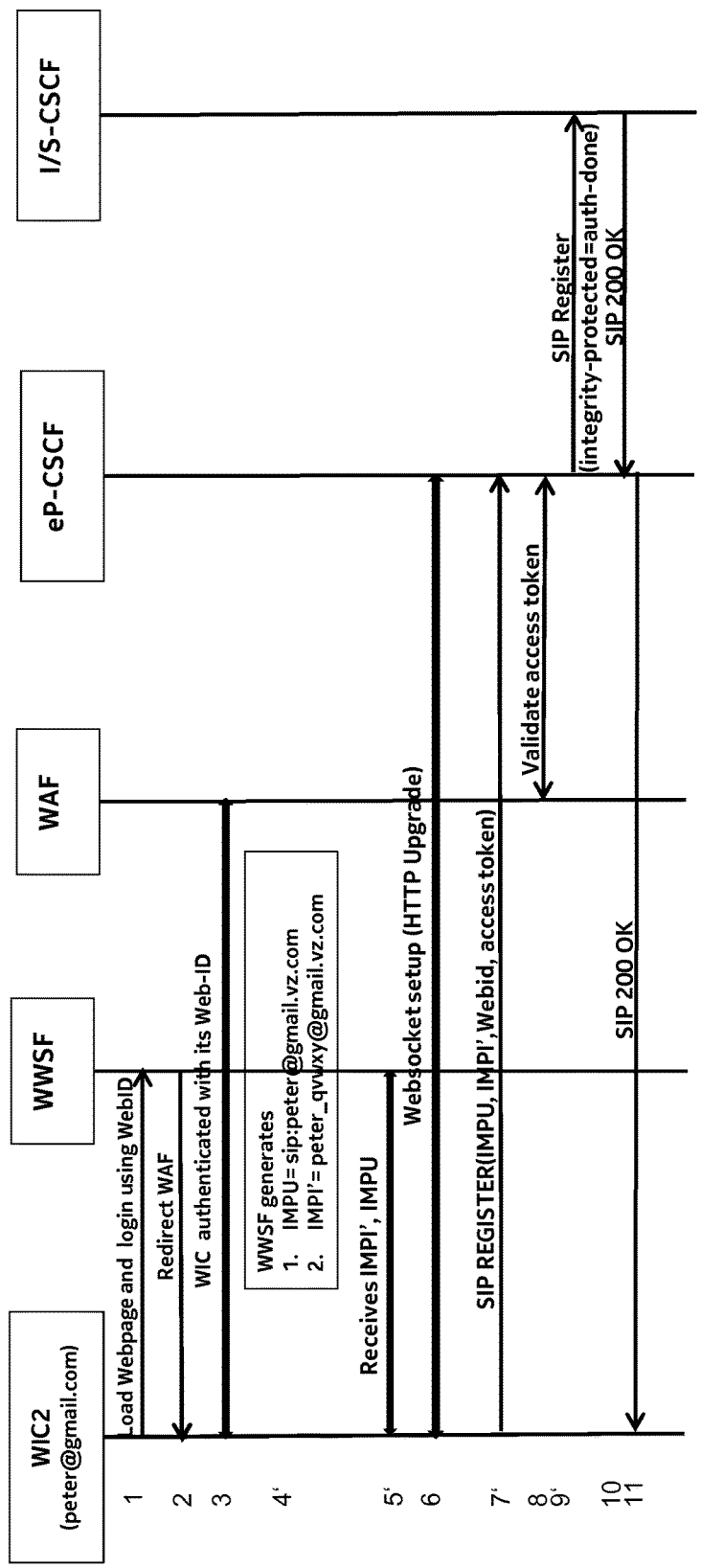
FIG. 3 shows a call flow according to an embodiment of the invention.

According to FIG. 3, the same Web-Id peter@gmail.com is used to have WebRTC based access from client WIC2 different from client WIC1 (another device or another browser instance on the same host), while the Web-Id peter@gmail.com is still registered at WIC1 for a SIP session. The other network elements (WWSF, WAF, eP-CSCF, I-CSCF, and S-CSCF) of FIG. 3 are the same as those of FIG. 2.

The messages and actions in FIG. 3 are the same as those of FIG. 2 except that IMPI in FIG. 2 is replaced by IMPI'. Therefore, a detailed description thereof is omitted, except for the differences, which are marked by the superscript ' and are outlined hereinafter:

In 4', another IMPI, named IMPI' in FIG. 3, different from IMPI in 4 of FIG. 2 is generated by WWSF, namely peter_qvwxy@gmail.vz.com, and accordingly, WIC2 receives in 5' the pair of IMPU and IMPI'. Note that IMPU is the same in 4 and 4' and correspondingly in 5 and 5'.

7 is replaced by 7' because WIC2 includes IMPI' instead of IMPI into the SIP REGISTER request. Correspondingly, 9 is replaced by 9' because the forwarded SIP request comprises IMPI' instead of IMPI.

Since eP-CSCF receives the pair IMPU/IMPI' different from IMPU/IMPI of FIG. 2, the former session from WIC1 is maintained and a new session is created for WIC2. Thus, the user may have different sessions for the same Web-Id from different clients.

FIG. 4 shows an apparatus according to an embodiment of the invention. The apparatus may be a web server such as a WWSF or an element thereof. FIG. 5 shows a method according to an embodiment of the invention. The apparatus according to FIG. 4 may perform the method of FIG. 5 but is not limited to this method. The method of FIG. 5 may be performed by the apparatus of FIG. 4 but is not limited to being performed by this apparatus.

The apparatus comprises monitoring means 110, private identification generating means 120, and providing means 130. The monitoring means 110 monitors if one of plural attempts of a web identity to register for an internet protocol multimedia service is received (S110).

If the one of the plural attempts is received (S110=yes), the private identification generating means 120 generates, for each of the plural attempts, a respective private user identification based on the web identity and a respective distinguishing identifier (S120). Therein, a probability that two of the private user identifications have a same value is less than a predefined limit; that is, each of the private user identifications is unique or substantially unique.

The providing means 130 provides the respective private user identification in response to the respective attempt (S130).

FIG. 6 shows an apparatus according to an embodiment of the invention. The apparatus may be a subscription server such as a HSS or an element thereof. FIG. 7 shows a method according to an embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises monitoring means 210, creating means 220, and providing means 230.

The monitoring means 210 monitors if a request to create a user profile is received (S210). The request comprises a private user identification. If the request is received (S210="yes"), the creating means 220 creates the user profile based on the private user identification (S220). The providing means 230 provides the user profile in response to the request (S230).

FIG. 8 shows an apparatus according to an embodiment of the invention. The apparatus comprises at least one processor 610, at least one memory 620 including computer program code, and the at least one processor 610, with the at least one memory 620 and the computer program code, being arranged to cause the apparatus to at least perform at least one of the methods according to FIGS. 5 and 7 and related description.

In the present description of some embodiments of the invention, the term "unique" is used in the sense of "substantially unique" if not otherwise indicated or made clear from the context. "Substantially unique" means that a probability that two IMPIs have the same value is less than a predefined limit. E.g., IMPIs may be considered as "unique" if the probability that two IMPIs have a same value is less than $10^{-2}$, preferably if the probability is less than $10^{-4}$, and more preferably if the probability is less than $10^{-6}$. For example, such a non-zero probability occurs if a random number is used to generate the IMPI. Then, the limit may result from the maximum value of the random number. Also, if the IMPI is generated based on time and only part of the time (e.g. only time of the day but not the day itself) is used, a same IMPI might be generated later (in the example: at one of the following days at the same time of the day). "Substantially unique" includes cases wherein the probability for two identical IMPIs is 0.

The generating and/or providing of the IMPI may be done separately from the generation of the IMPU. For example, the IMPU may be conventionally generated and provided, while the IMPI is generated and provided by an apparatus according to an embodiment of the invention. Also, in some embodiments of the invention, IMPI and IMPU may be generated separately but provided jointly.

Embodiments of the invention may be employed in a 3GPP network such as an IMS core network. They may be employed also in other 3GPP and non-3GPP mobile networks such as CDMA, EDGE, LTE, LTE-A, UTRAN, WiFi, WLAN networks, etc.

A terminal may be a user equipment such as a mobile phone, a smart phone, a PDA, a laptop, a tablet PC, a wearable, a machine-to-machine device, or any other device which may be connected to the respective network such as a 3GPP network. If not otherwise indicated or made clear from the context, the terms "UE" and "user" are synonymously used in the present application.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that example embodiments of the present invention provide, for example a base station such as a web server function such as a WWSF, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques, means, devices, or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
at least one processor; and
at least one memory including computer program code,
the at least one memory and the computer program code configured, with the at least one processor, to cause the apparatus at least to:
monitor, for each of plural attempts of a web identity to register for an internet protocol multimedia service, if the respective attempt is received, wherein the web identity comprises at least one of a local part or a domain:
starting authentication for token issuance using the web identity;
generate, for each of the plural attempts if the respective attempt is received, a respective private user identification based on the web identity and a respective public user identification; and
provide the respective private user identification and the respective public user identification in response to the respective attempt.

2. The apparatus according to claim 1,
wherein the at least one memory and the computer program code are further configured, with the at least one processor, to cause the apparatus at least to:
generate a public user identification based on the web identity, and
provide the public user identification in response to each of the plural attempts.

3. The apparatus according to claim 1,
wherein the at least one memory and the computer program code are further configured, with the at least one processor, to cause the apparatus at least to:
check if the web identity is authenticated;
inhibit, if the web identity is not authenticated, the generating and/or the providing.

4. The apparatus according to claim 1,
wherein the at least one memory and the computer program code are further configured, with the at least one processor, to cause the apparatus at least to:

generate a portion of each of the private user identifications based on a template.

5. The apparatus according to claim 1,
wherein each of the private user identifications is unique under all private user identifications.

6. The apparatus according to claim 5,
wherein each of the respective portions is additionally based on a respective random number and/or on a time when the respective private user identification is generated.

7. The apparatus according to claim 1,
wherein the at least one memory and the computer program code are further configured, with the at least one processor, to cause the apparatus at least to:
count the private user identifications in order to obtain a number of the private user identifications;
prohibit, if the number of the private user identifications is larger than a threshold, the generating of the respective private user identification and/or the providing of the respective private user identification.

8. The apparatus according to claim 1,
wherein the at least one memory and the computer program code are further configured, with the at least one processor, to cause the apparatus at least to generate, for each of the plural attempts if the respective attempt is received, a respective distinguishing identifier.

9. A method comprising:
monitoring, for each of plural attempts of a web identity to register for an internet protocol multimedia service, if the respective attempt is received, wherein the web identity comprises at least one of a local part or a domain;
starting authentication for token issuance using the web identity;
generating for each of the plural attempts if the respective attempt is received a respective private user identification based on the web identity and a respective public user identification; and
providing the respective private user identification and the respective public user identification in response to the respective attempt.

10. The method according to claim 9,
further comprising;
generating a public user identification based on the web identity, and providing the public user identification in response to each of the plural attempts.

11. The method according to claim 9,
further comprising;
checking if the web identity is authenticated; inhibiting, if the web identity is not authenticated, the generating of the respective private user identification and/or the providing of the respective private user identification.

12. The method according to claim 9,
further comprising:
counting the private user identifications in order to obtain a number of the private user identifications;
prohibiting, if the number of the private user identifications is iarger than a threshold, the generating of the private user identifications and/or the providing of the private user identifications.

13. The method according to claim 9,
further comprising generating, for each of the plural attempts if the respective attempt is received, a respective distinguishing identifier.

14. A computer program product embodied on a non-transitory computer-readable medium, said computer program product comprising a set of instructions which, when executed on an apparatus, is configured to cause the apparatus to carry out the method according to claim 9.

* * * * *